United States Patent Office 3,627,484
Patented Dec. 14, 1971

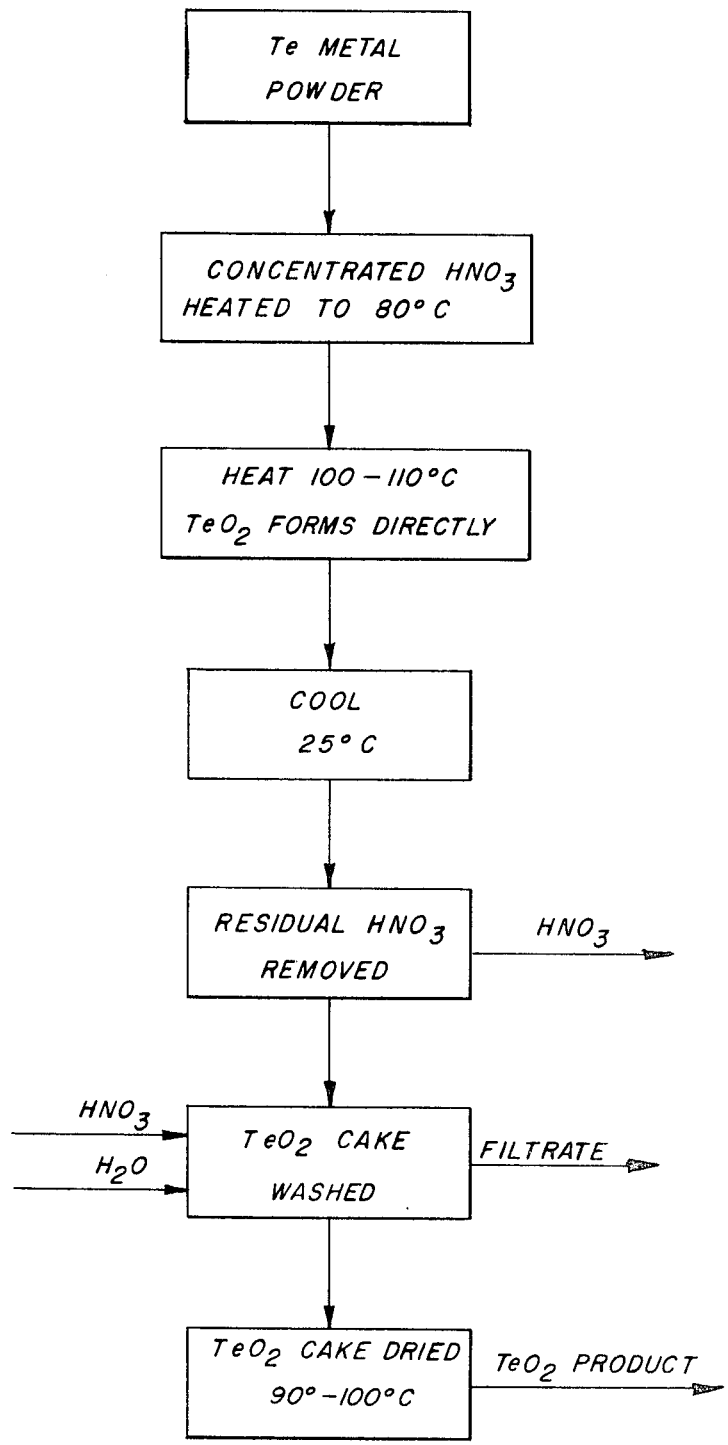

3,627,484
PROCESS FOR PRODUCING TELLURIUM DIOXIDE OF LOW IRON CONTENT
Stephen E. French and Thomas K. Preston, Rochester, N.Y., assignors to Eastman Kodak Company, Rochester, N.Y.
Filed Mar. 2, 1970, Ser. No. 15,565
Int. Cl. C01b 19/00
U.S. Cl. 23—139                                8 Claims

ABSTRACT OF THE DISCLOSURE

Powdered tellurium metal is added to hot concentrated nitric acid, with agitation. The reaction mixture is then heated at 110–110° C. until evolution of nitrogen dioxide stops and the direct formation of tellurium dioxide is complete. Then the reaction mixture is cooled to room temperature, the excess nitric acid is removed by siphoning and filtration, and the filter cake is washed with nitric acid and with water, after which the damp cake is heated at 90–150° C. to dry it without decomposition.

BACKGROUND OF THE INVENTION

Field of the invention

The present invention relates to a novel process for producing tellurium dioxide of such low iron content that it can be used for manufacturing glasses of low color and high refractive index.

The prior art

British Pat. No. 784,869 describes a process for producing high-purity tellurium dioxide by starting with high-purity quadruple distilled tellurium metal powder, dissolving the powder in diluted nitric acid, evaporating the resulting solution until crystals of tellurium basic nitrate separate, washing and drying the crystals, and then heating the crystals at a temperature of 400–430° C. to decompose the basic nitrate to the dioxide.

This procedure is disadvantageous in requiring expensive quadruple distilling of commercial tellurium metal to eliminate impurities, such as iron, which add color to glasses subsequently produced. Moreover, the British procedure requires much more apparatus than is desirable, for distillation, reaction and decomposition at a high temperature. The decomposition step, particularly, requires a large furnace which is expensive to purchase, maintain, and operate. All of these features add to the cost of the final product.

SUMMARY OF THE INVENTION

In accordance with our invention a process for producing high-purity tellurium dioxide is provided which eliminates the disadvantages of the prior art, and results in a high-purity tellurium dioxide product at relatively low cost.

The key step in our novel process is the reacting of finely divided particles of commercial purity tellurium metal with concentrated reagent-quality aqueous nitric acid which results in the direct formation of solid particles of tellurium dioxide in the reaction mixture, unlike the tellurium basic nitrate of the prior art. The reaction advantageously is initiated by gradually adding 100 mesh tellurium metal to a pool of 67% strength nitric acid (at 80° C.) in a steam jacketed glass-lined reactor vessel while agitating with a motor-driven stirrer. After all metal has been added, the reaction mixture is heated at 100–110° C. until the evolution of nitrogen dioxide stops and the formation of tellurium dioxide is complete (usually between 1 and 4 hours). Then the stirrer is stopped, the reaction mixture is allowed to cool to room temperature, the excess nitric acid is mostly siphoned off, and the remaining thick slurry is filtered, leaving a residual cake of tellurium dioxide.

The cake is washed on the filter funnel with nitric acid, and then with distilled water to remove residual nitric acid, after which the white damp tellurium dioxide cake is heated without decomposition to dry it. Drying can be accomplished by first pressing out excess water, followed by final drying in a hot air oven at 90–150° C. until the product is dry to the touch (usually 72 hours). The drying also can be accomplished in a vacuum oven at about 110° C.

The process is operable with reagent grade concentrated aqueous nitric acid containing between 65 and 70% $HNO_3$ by weight; and heating of the reaction mixture can be between 90 and 110° C. The nitric acid should contain less than 5 p.p.m. of iron to assure that any iron in the tellurium metal will go into solution. Fuming nitric acid does not react with the tellurium metal.

The starting tellurium metal can have an iron content as high as 50 p.p.m., yet the final product will contain as little as 10 p.p.m. or less. This is attributable to the dissolving of iron compounds into the nitric acid so that they are separated from the tellurium dioxide solids.

The proportions of tellurium and nitric acid advantageously should be between 100% and 600% molar excess of 67% $HNO_3$ over the amount theoretically required to convert all of the Te to $TeO_2$. With less than 100% excess, the reaction mixture is so viscous as to prevent adequate stirring. Above 600% excess, the reaction can be performed successfully, but not economically.

THE DRAWING

The single figure of the drawing is a flow sheet showing the steps of our novel process.

THE PREFERRED EMBODIMENTS

Example 1

402 pounds of reagent quality aqueous nitric acid (67% $HNO_3$, iron content less than 5 p.p.m.) is placed in an open 50 gallon steam jacketed glass-lined reactor kettle having a glass-over-iron stirrer driven by an air motor. The nitric acid is then heated to 80° C. The stirrer is run at high speed to agitate the reaction mixture while 25 pounds of 100 mesh (U.S. Standard) 99.7% pure commercial tellurium metal containing 50 p.p.m. of iron is gradually added over a 1.5 hour period at 80° C. Then the reaction mixture is heated to 100–110° C. and held at temperature while continuing to stir until the evolution of nitrogen dioxide is practically complete. The stirrer and the heat are stopped and the reaction mixture is allowed to cool overnight in the kettle to room temperature.

The excess nitric acid is siphoned off and the residual cake of tellurium dioxide solids is washed with cold aqueous nitric acid (desirably 67% strength) to wash out mother liquor and impurities, followed by 10 gallons of pure redistilled water which is filtered off. The wash with distilled water is repeated, after which the damp white cake of tellurium dioxide is pressed on a 20 inch ceramic funnel to remove most of the residual water. The damp cake is then dried in a hot air oven at 90–100° C. or a vacuum oven at 110° C. in glass trays for about 72 hours until the product is dry to the touch.

The yield is 18 pounds of tellurium dioxide product containing 10 p.p.m. or less of iron, and 0–8% volatile material when heated to 200° C. The volatile material, when present, consists of trapped water and nitric acid. Infrared spectra indicate no nitrate salts in the product.

Example 2

The same process is carried out starting with 128 grams of tellurium metal and 752 grams of 67% aqueous nitric acid.

The product has been used as the principle ingredient in tellurium glass and resulted in a glass of acceptable low color and high index of refraction. No samples of tellurium dioxide purchased on the open market have proved adequate.

The invention has been described in detail with particular reference to preferred embodiments thereof, but it will be understood that variations and modifications can be effected within the spirit and scope of the invention.

We claim:

1. A process for producing tellurium dioxide comprising:
   (a) reacting finely divided particles of tellurium metal with concentrated nitric acid and directly forming solid particles of tellurium dioxide in the reaction mixture, said nitric acid having a concentration between about 65 and about 70%, and said reacting being performed while heating said reacting mixture until evolution of nitrogen dioxide stops;
   (b) removing excess nitric acid from said reaction mixture and leaving solid tellurium dioxide;
   (c) washing said solid tellurium dioxide with water to remove residual nitric acid; and
   (d) drying said solid tellurium dioxide as product.

2. A process in accordance with claim 1 wherein said reacting is performed while agitating and heating said reaction mixture at a temperature between 100 and 110° C. until evolution of nitrogen dioxide stops.

3. A process in accordance with claim 2, also comprising cooling said reaction mixture to about room temperature before removing excess nitric acid.

4. A process in accordance with claim 1 wherein said solid tellurium dioxide is dried by heating at 90–150° C.

5. A process in accordance with claim 1 wherein said tellurium metal has a substantial iron content of the order of 50 p.p.m., and wherein said tellurium dioxide product has an iron content of not more than 10 p.p.m.

6. A process in accordance with claim 2 wherein said nitric acid has a concentration of about 67%.

7. A process in accordance with claim 1 wherein said nitric acid contains less than 5 p.p.m. of iron.

8. A process in accordance with claim 1 wherein there is present in said reaction mixture a molar excess of nitric acid between 100% and 600% over the amount theoretically required to convert all of said tellurium metal to tellurium dioxide.

References Cited

UNITED STATES PATENTS 2,648,638   8/1953   Richter _____ 23—139 X

FOREIGN PATENTS 784,869   10/1957   Great Britain _____ 23—139

OTHER REFERENCES

Dutton et al., "Chemical Reviews," vol. 6, December 1966, pp. 657 and 661.

HERBERT T. CARTER, Primary Examiner